US010984290B1

United States Patent
Goel et al.

(10) Patent No.: US 10,984,290 B1
(45) Date of Patent: Apr. 20, 2021

(54) MULTI-TASK LEARNING FOR REAL-TIME SEMANTIC AND/OR DEPTH AWARE INSTANCE SEGMENTATION AND/OR THREE-DIMENSIONAL OBJECT BOUNDING

(71) Applicant: Zoox, Inc., Foster City, CA (US)

(72) Inventors: Kratarth Goel, Albany, CA (US); James William Vaisey Philbin, Palo Alto, CA (US); Praveen Srinivasan, San Francisco, CA (US); Sarah Tariq, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 16/732,243

(22) Filed: Dec. 31, 2019

Related U.S. Application Data

(60) Provisional application No. 62/935,636, filed on Nov. 15, 2019.

(51) Int. Cl.
G06K 9/00 (2006.01)
G06K 9/62 (2006.01)
G06T 7/11 (2017.01)
G06T 7/50 (2017.01)

(52) U.S. Cl.
CPC .............. *G06K 9/6262* (2013.01); *G06T 7/11* (2017.01); *G06T 7/50* (2017.01); *G06T 2207/20081* (2013.01); *G06T 2207/30252* (2013.01)

(58) Field of Classification Search
CPC .......... G06K 9/6262; G06T 7/50; G06T 7/11; G06T 2207/20081; G06T 2207/30252
See application file for complete search history.

(56) References Cited

U.S. PATENT DOCUMENTS

| | | |
|---|---|---|
| 2019/0026550 A1 | 1/2019 | Yang et al. |
| 2019/0057507 A1 | 2/2019 | El-Khamy et al. |
| 2019/0147245 A1 | 5/2019 | Qi et al. |
| 2019/0220698 A1 | 7/2019 | Pradeep |
| 2019/0258878 A1* | 8/2019 | Koivisto ............... G05D 1/00 |
| 2019/0385021 A1* | 12/2019 | Sasaki ................ G06K 9/726 |
| 2020/0066036 A1* | 2/2020 | Choi ..................... G06T 7/75 |
| 2020/0134331 A1* | 4/2020 | Poddar ................ G06T 5/006 |

FOREIGN PATENT DOCUMENTS

WO  WO2019099428 A1  5/2019

OTHER PUBLICATIONS

PCT Search Report and Written Opinion dated Feb. 25, 2021 for PCT Application No. PCT/US20/59734, 11 pages.

\* cited by examiner

*Primary Examiner* — Ping Y Hsieh
(74) *Attorney, Agent, or Firm* — Lee & Hayes, P.C.

(57) ABSTRACT

Training a machine-learning (ML) architecture to determine three or more outputs at a rate of 30 or more frames per second on consumer grade hardware may comprise jointly training components of the ML using loss(es) determined across the components and/or consistency losses determined between outputs of two or more components. The ML architecture discussed herein may comprise one or more sets of neural network layers and/or respective components for determining a two and/or three-dimensional region of interest, semantic segmentation, direction logits, depth data, and/or instance segmentation associated with an object in an image.

20 Claims, 7 Drawing Sheets

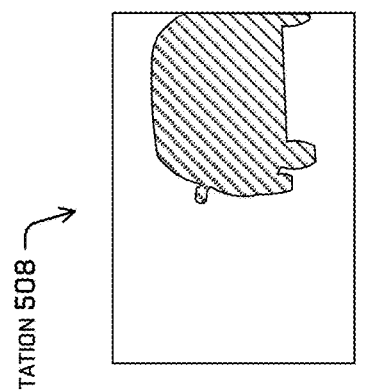
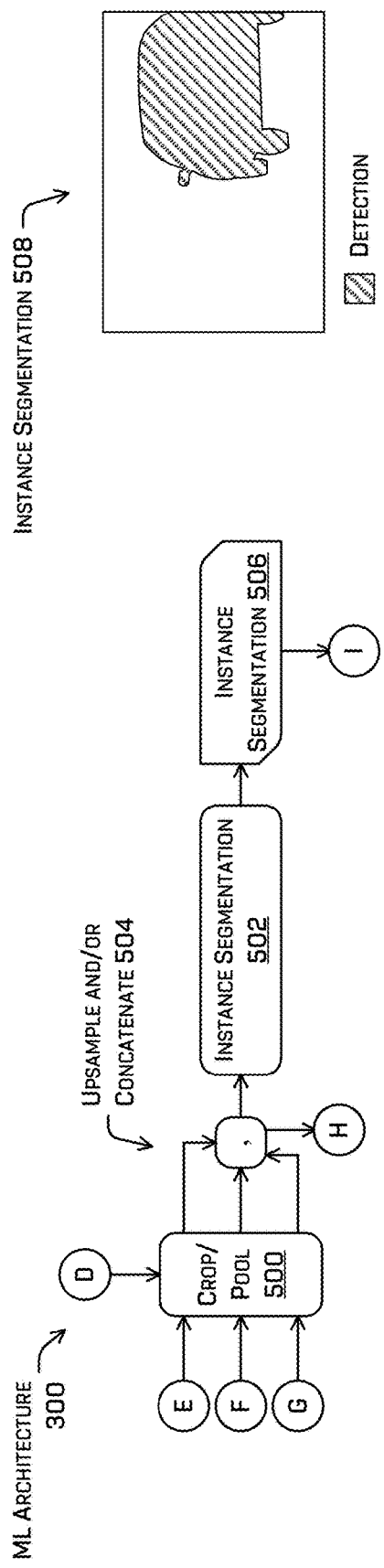
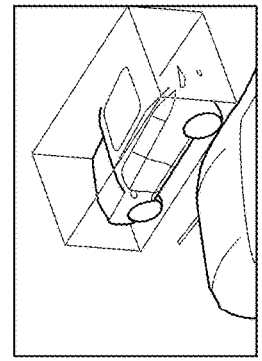
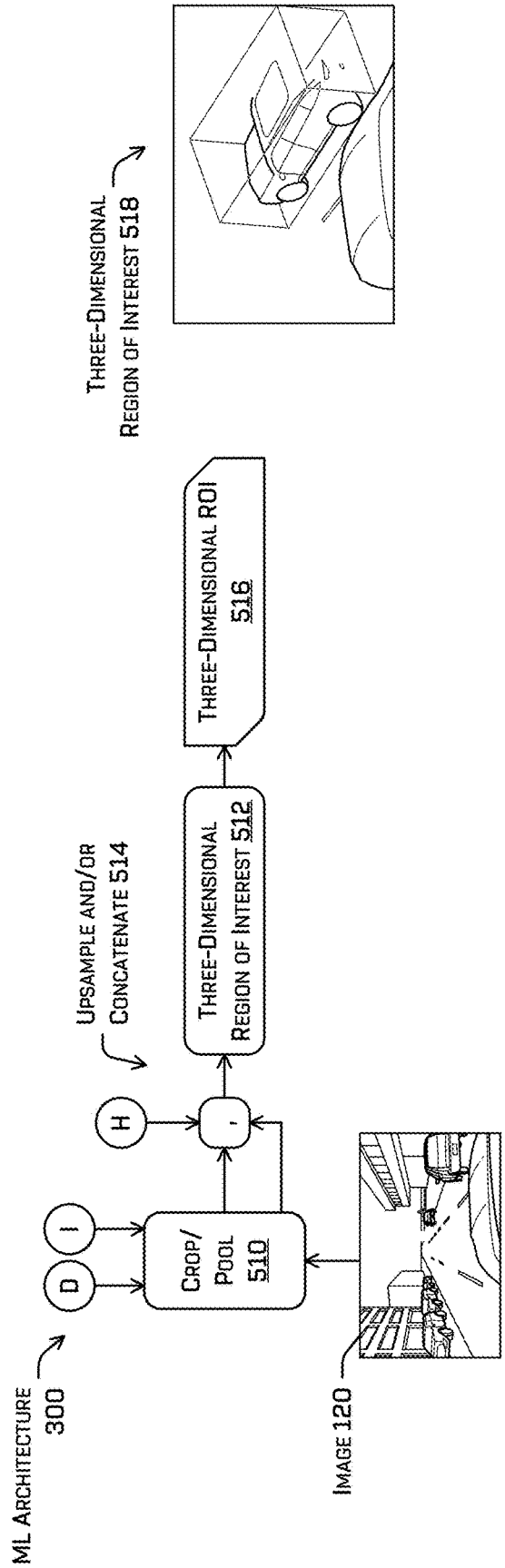
FIG. 5A
FIG. 5B
FIG. 5C
FIG. 5D

US 10,984,290 B1

MULTI-TASK LEARNING FOR REAL-TIME SEMANTIC AND/OR DEPTH AWARE INSTANCE SEGMENTATION AND/OR THREE-DIMENSIONAL OBJECT BOUNDING

RELATED APPLICATION

This application claims the benefit of U.S. Provisional Application No. 62/935,636, filed Nov. 15, 2019, the entirety of which is incorporated herein.

BACKGROUND

Computer vision is used in numerous applications, such as operating autonomous vehicles, identifying individuals for security purposes, etc. Computer vision techniques may include building software components that determine information regarding environments represented in the image and provide that information to the computer in a form that the computer can use to conduct further operations (e.g., tracking detected objects). Although advances have been made in computer vision to increase the accuracy of object detection, many computer vision techniques take too long to process an image to be useful for real-time applications and may require the use of multiple neural networks, using up memory space rendering them unable to be used for various applications, such as self-driving vehicles.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

FIG. 5A illustrates a block diagram of additional or alternative components of the ML architecture, namely a cropping and/or pooling component and/or an instance segmentation component.

FIG. 5B illustrates an example of an instance segmentation determined by the ML architecture based at least in part on an example image.

FIG. 5C illustrates a block diagram of additional or alternative components of the ML architecture, namely a cropping and/or pooling component and/or a three-dimensional ROI component.

FIG. 5D illustrates an example of a three-dimensional ROI determined by the ML architecture based at least in part on an example image.

DETAILED DESCRIPTION

Figure 1:
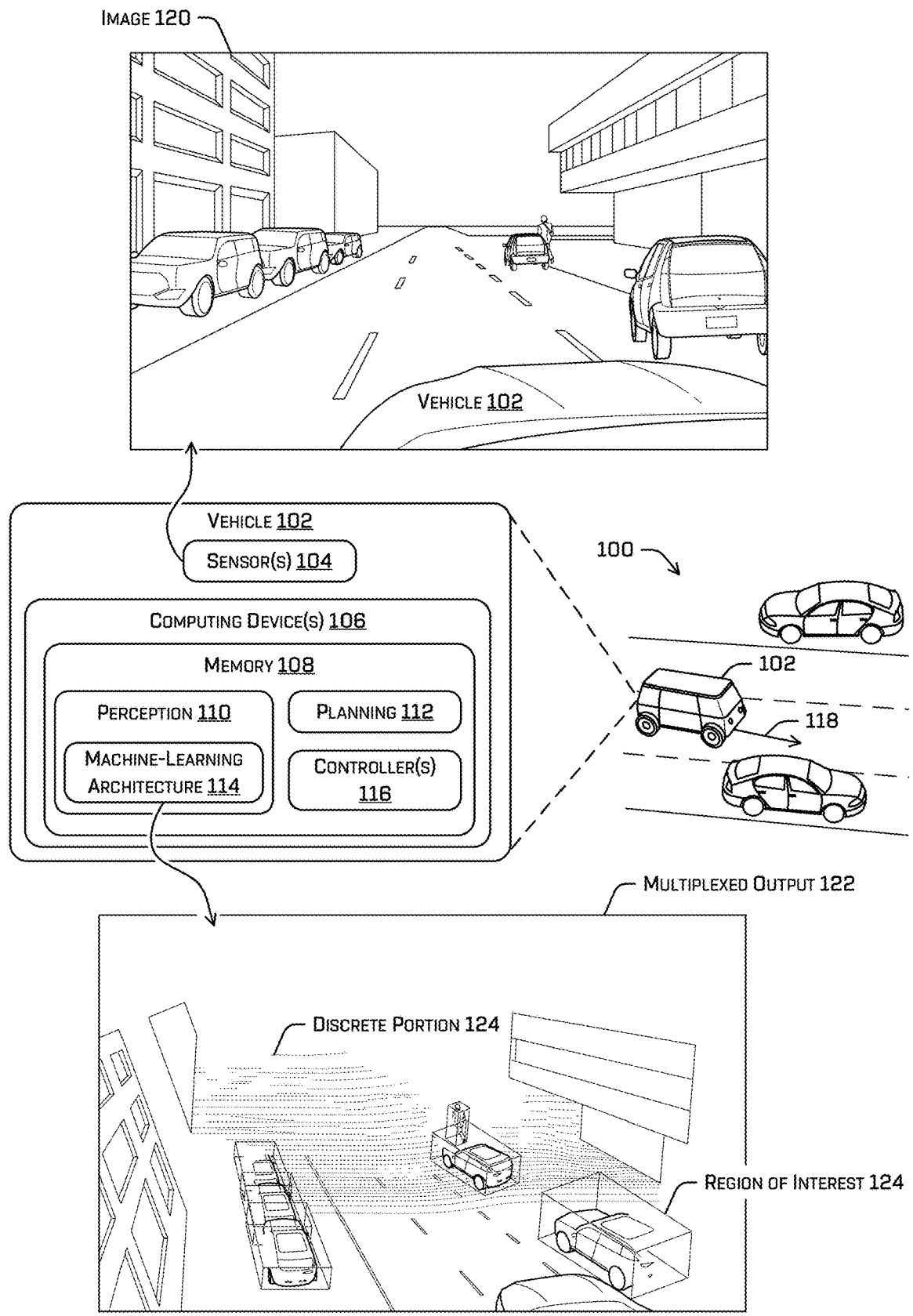
FIG. 1 illustrates an example scenario in which an autonomous vehicle determines one or more outputs using the machine-learning (ML) architecture discussed herein and generates a trajectory using the output.

The techniques discussed herein may improve computer vision by increasing the accuracy and/or precisions of object detection, increasing the amount of information about an object detection available from a single machine-learning (ML) model, reducing various computer vision artifacts (e.g., trail at boundary of object detection), and/or decreasing processing time such that the techniques may be performed in real-time. In some examples, the ML model discussed herein may output an object detection comprising the four or more outputs discussed herein at a rate of 30 or more frames per second on consumer grade hardware (e.g., a consumer grade graphics processing unit (GPU)). This operating rate is sufficient for many real-time applications, such as autonomous vehicle control, augmented reality, and/or the like.

The ML architecture discussed herein may receive an image and be trained to output four or more outputs, although it is contemplated that the ML architecture may output more or less outputs. In some examples, the ML architecture may determine an object detection comprising a two-dimensional region of interest (ROI), a classification, a semantic segmentation, direction logits, depth data (e.g., depth bin and/or depth residual), and/or instance segmentation associated with an object. Additionally or alternatively, the ML architecture may comprise components to output a three-dimensional region of interest associated with the object. In some examples, the ML architecture may output any of this data in a single forward propagation pass.

The techniques discussed herein may comprise jointly training components of the ML architecture, which may comprise a backbone ML model that comprises a set of neural network layers and respective components for determining an ROI (e.g., two-dimensional and/or three-dimensional), semantic segmentation, direction logits, depth data, and/or instance segmentation. For simplicity, each of the outputs discussed herein are referenced in sum as "tasks." For example, the ML architecture comprise a detection component associated with the task of determining an ROI and/or classification associated with an object, another component associated with the task of determining a semantic segmentation, and so on.

In some examples, jointly training components of the ML model may comprise providing a training data set to the ML model and receiving predicted outputs from the ML model. For example, the training data may include at least a first image and the predicted outputs may include respective outputs for each of the tasks described herein associated with the first image. Jointly training the components may comprise determining a joint loss based on errors between the outputs and respective ground truth information indicated by the training data, and modifying the components based at least in part on the joint loss (e.g., using gradient descent). The techniques discussed herein may adjust the joint loss to enforce consistency of the losses.

For example, enforcing consistency may comprise determining an uncertainty associated with a task, the uncertainty indicating a respective component's confidence that the output generated thereby is correct/conforms to the ground truth data, and adjusting a loss determined based at least in part on output and the ground truth data. The adjusting may comprise scaling the loss based at least in part on the uncertainty. Enforcing the consistency may additionally or alternatively comprise driving confidences to be similar. For example, an ROI component may output a two-dimensional ROI and a confidence associated therewith and a semantic segmentation component may output a semantic segmentation indicating a collection of pixels of an image that are associated with a same classification and respective confidences associated with each pixel. The techniques may comprise determining an average confidence or a representative confidence (e.g., an approximated average determined using a summed-area table over the confidences associated with the semantic segmentation) associated with the semantic segmentation and determining a consistency loss based at least in part on a difference between the average and/or representative confidence associated with the semantic segmentation and the confidence associated with the two-dimensional ROI. Of course, any number of consistency losses may be used in training such a network. Additional examples include, but are not limited to, comparing (e.g., determining a difference between) the ROI output by the network a bounding region determined based on one or more of the instance segmentation, semantic segmentation, and/or direction data; projecting a three-dimensional ROI into the image frame and comparing the resulting projected region with the two-dimensional ROI; determining a difference between lidar data and depth data output by the ML architecture; determining a difference between lidar data, depth data, and/or a bounding region associated with a three-dimensional ROI, and the like.

In some examples, the ground truth included in the training data may be supervised ground truth data (e.g., human and/or machine labeled), semi-supervised (e.g., only a subset of data is labeled), and/or unsupervised (e.g., where no labels are provided). In some instances, ground truth data may be sparse, such as when lidar data is used as ground truth data to determine a loss associated with depth data generated by a depth component of the ML architecture discussed herein. Such data may be an example of semi-supervised learning. The techniques remedy this and make sensor measurements a useful source of ground truth data by associating a respective sensor measurement with a group of (denser) output data generated by the ML architecture.

For example, the ML architecture may output depth data associated with up to each pixel of an image, whereas the number of lidar points associated with the image may be far fewer than the number of pixels. Regardless, the techniques may comprise associating a lidar point with a group of pixels (or other discrete portions of output) based at least in part on a number of lidar points, an ROI, a semantic segmentation, an instance segmentation, and/or directional data (e.g., direction logits that point toward the center of an object). The lidar point associated with the group of pixels will act as the ground truth data for that group of pixels.

In some examples, the ML architecture discussed herein may comprise a backbone component comprising a set of layers that generate respective features. The techniques discussed herein may comprise aggregating these features into a feature data structure (e.g., a dense feature data map). For example, aggregating the features into the feature data structure may comprise upsampling the features to a common resolution and determining an element-wise sum and/or concatenation of the upsampled features. In some examples, the aggregation/creation of the feature data structure may additionally or alternatively comprise convolving the summed features to decrease the number of channels (e.g., using a 1×1 filter such as to accomplish channel-wise pooling), performing one or more atrous convolutions thereon (e.g., at increasing dilation rates), and/or convolving once more to restore the number of channels (e.g., using a 1×1 filter, such as to project the features into additional channels).

In some examples, the two-dimensional ROIs may be generated directly from the features determined by the backbone layers, whereas the semantic segmentation, direction logits, and/or depth data may be determined based at least in part on the feature data structure (summed, concatenated, and/or convolved data). The techniques may comprise determining the instance segmentation based at least in part on the cropping the semantic segmentation, direction logits, and/or depth data based at least in part on a two-dimensional ROI, concatenating the crops together, and determining the instance segmentation from the cropped and concatenated data. Determining a three-dimensional ROI associated with the same object may comprise taking the same cropped and concatenated data used to generate an instance segmentation for an object and concatenating an image crop associated with the object and the instance segmentation thereto. In other words, determining the three-dimensional ROI may be generated based at least in part on crops of the semantic segmentation, direction logits, depth data, original image, and/or instance segmentation.

Contrary to some existing computer vision techniques, the components discussed herein may be part of one network with sub-networks devoted to different tasks (e.g., ROI generation, semantic segmentation, and so on). The components may be jointly trained, which may comprise forward propagating images through the network and backpropagating the losses discussed herein through each of the components discussed herein. It is understood that Example Scenario FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc., and/or any technology incorporate computer vision. Moreover, even though the vehicle 102 is depicted as a land vehicle, vehicle 102 may be a spacecraft, watercraft, mining vehicle, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle. The data and/or sensors discussed herein may be real-world and/or simulated.

According to the techniques discussed herein, the vehicle 102 may receive sensor data from sensor(s) 104 of the vehicle 102. For example, the sensor(s) 104 may include an image sensor (e.g., a visible light camera, an infrared camera), a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic and/or sonar sensor, and/or other depth-sensing sensor), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, a machine-learning (ML) architecture 114, and/or system controller(s) 116. In some examples, the perception component 110 may comprise a primary perception component among other perception components, such as a secondary perception component that may be part of collision avoidance component. The perception component 110 may comprise ML architecture 114, which may be one of one or more ML components of a pipeline. The ML architecture 114 may be configured to accomplish various computer vision tasks, i.e., to determine what is in the environment surrounding the vehicle based at least in part on image data. In some examples, the perception component 110, planning component 112, and/or ML architecture 114 may comprise a pipeline of hardware and/or software, which may include one or more GPU(s), ML model(s), Kalman filter(s), computer-executable instructions, and/or the like.

In general, the perception component 110 may determine what is in the environment surrounding the vehicle 102 and the planning component 112 may determine how to operate the vehicle 102 according to information received from the perception component 110.

In some examples, the perception component 110 may receive sensor data from the sensor(s) 104 and determine data related to objects in the vicinity of the vehicle 102 (e.g., classifications associated with detected objects, instance segmentation(s), semantic segmentation(s), two and/or three-dimensional bounding boxes, tracks), route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The object classifications determined by the perception component 110 may distinguish between different object types such as, for example, a passenger vehicle, a pedestrian, a bicyclist, a delivery truck, a semi-truck, traffic signage, and/or the like. A track may comprise a historical, current, and/or predicted object position, velocity, acceleration, and/or heading. The data produced by the perception component 110 may be collectively referred to as perception data. Once the perception component 110 has generated perception data, the perception component 110 may provide the perception data to the planning component 112.

The planning component 112 may use the perception data received from perception component 110 and/or localization data received from the localization component 114 to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). In some examples, the planning component 112 may determine trajectory 118 based at least in part on the perception data and/or other information such as, for example, one or more maps, localization data generated by a localization component (unillustrated in this figure), and/or the like.

For example, the planning component 112 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 microsecond, half a second) to control the vehicle to traverse the route (e.g., in order to avoid any of the detected objects); and select one of the potential trajectories as a trajectory 118 of the vehicle 102 that may be used to generate a drive control signal that may be transmitted to drive components of the vehicle 102. FIG. 1 depicts an example of such a trajectory 118, represented as an arrow indicating a heading, velocity, and/or acceleration, although the trajectory itself may comprise instructions for controller(s) 116, which may, in turn, actuate a drive system of the vehicle 102. The trajectory 118 may comprise instructions for controller(s) 116 to actuate drive components of the vehicle 102 to effectuate a steering angle and/or steering rate, which may result in a vehicle position, vehicle velocity, and/or vehicle acceleration. For example, the trajectory 118 may comprise a target heading, target steering angle, target steering rate, target position, target velocity, and/or target acceleration for the controller(s) 116 to track.

In some examples, the controller(s) 116 may comprise software and/or hardware for actuating drive components of the vehicle 102 sufficient to track the trajectory 118. For example, the controller(s) 116 may comprise one or more proportional-integral-derivative (PID) controllers.

In some examples, ML architecture 114 may receive one or more images, such as image 120, from one or more image sensors of the sensor(s) 104. In some examples, the ML architecture 114 may receive a stream of images from an image sensor. The image sensor may be configured to output the images to the ML architecture 114 and/or other components at a rate that may or may not be synchronous with an output of the ML architecture 114. According to the techniques described herein, the ML architecture 114 may generate the output discussed herein at a rate of 30 frames per second or faster on consumer grade hardware, although, in some examples, the ML architecture 114 may be slower if desired.

In some examples, the ML architecture 114 discussed herein be a single network having a backbone component and various sub-networks, all of which are jointly trained according to the discussion herein, although in additional or alternate examples at least some of the network may be frozen or separately trained from one or more other components. The ML architecture 114 discussed herein may be configured to receive an image and output a two-dimensional region of interest (ROI) associated with an object in the image, a semantic segmentation associated with the image, directional data associated with the image (e.g., which may comprise a vector per pixel pointing to the center of a corresponding object), depth data associated with the image (which may be in the form of a depth bin and an offset), an instance segmentation associated with the object, and/or a three-dimensional ROI. Each of these is referred to herein as different tasks and may be associated with different respective components. In at least one non-limiting example, the ML architecture 114 may generate the outputs in a single forward propagation.

An ROI may comprise a bounding box, some other bounding shape, and/or a mask. A semantic segmentation may comprise a per-pixel indication of a classification associated therewith (e.g., semantic label, such as "pedestrian," "vehicle," "cyclist," "oversized vehicle," "articulated vehicle," "animal"), although a semantic label may be associated with any other discrete portion of the image and/or feature maps (e.g., a region, a cluster of pixels). Directional data may comprise a per-pixel (or per-other discrete portion) indication of a direction of a nearest center of an object. A portion of the direction data associated with a discrete portion of an image may be referred to as a direction logit and may comprise an indication of a likelihood that an object center is in a direction relative to the discrete portion indicated by the direction logit. Depth data may comprise an indication of a distance from an image sensor to a surface associated with a portion of the image which, in some examples, may comprise an indication of a depth "bin" and offset.

For example, FIG. 1 depicts an output 122 that represents some of the outputs generated by the ML architecture 114 in a single pass using image 120. Output 122 comprises a three-dimensional ROI 124 associated with an object detected in image 120 and represent the depth data with image data overlaid on respective discrete portions of depth data. Note that parts of the environment that are not visible in image 120 are not visible in the output and the depth data becomes more sparse with increased distance from the vehicle 102. Also, note that the representation of output 122 merely comprises a representation of two of four or more outputs generated by the ML architecture 114. An output 122 used by the planning 112 component may comprise a two-dimensional ROI, directional data, and/or instance segmentation in addition to or instead of the image data, depth data, and/or three-dimensional ROI.

Example System

Figure 2:
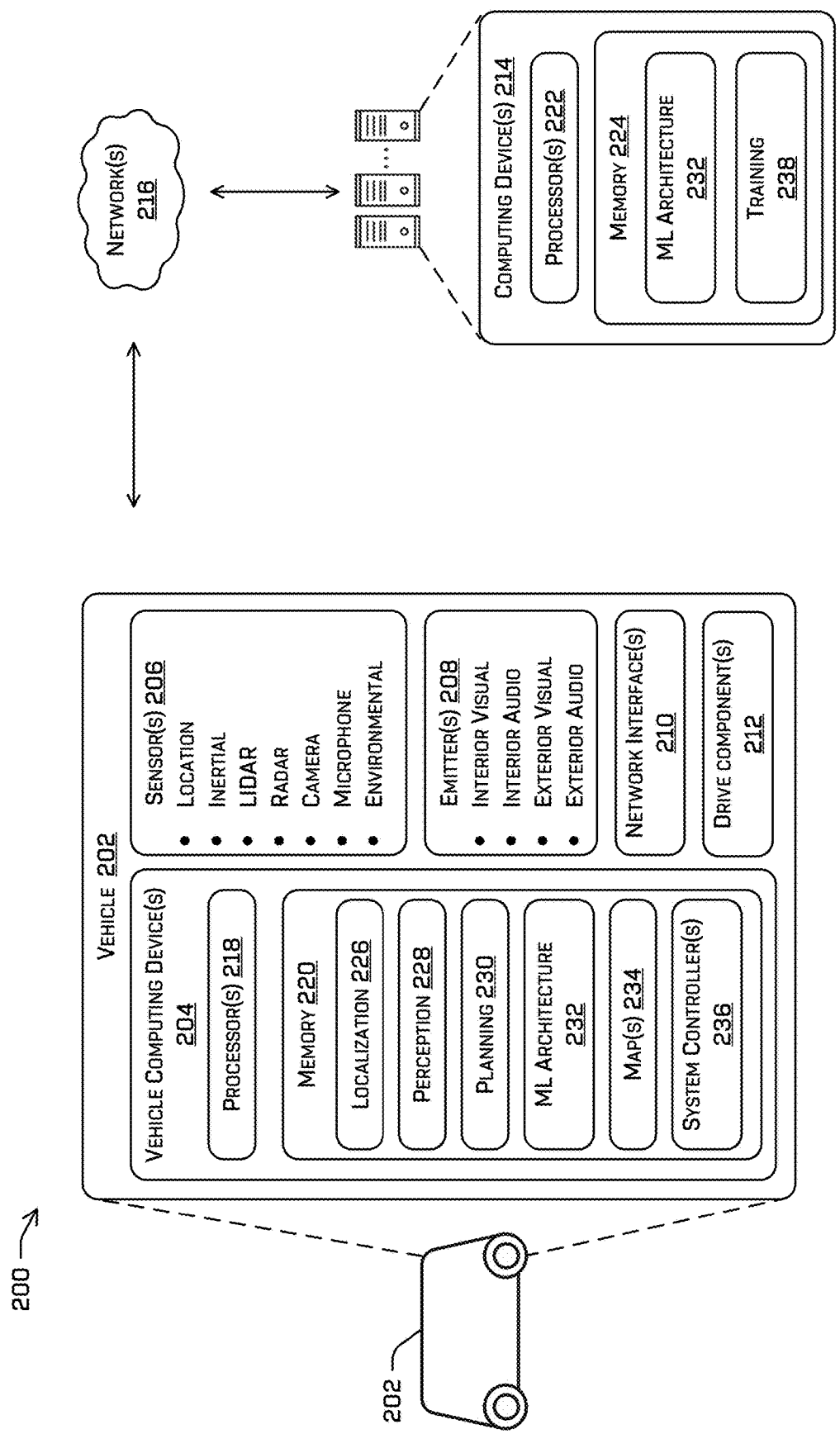
FIG. 2 illustrates a block diagram of an example system comprising the ML architecture and training component discussed herein.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface (s) 210 may additionally or alternatively allow the vehicle to communicate with other nearby computing device(s) (e.g., other vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., IMUs, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, ML architecture 232, map(s) 234, and/or system controller(s) 236. Perception component 228 may represent perception component 110, planning component 230 may represent planning component 112, and/or ML architecture 232 may represent ML architecture 114.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) 234 of an environment and can continuously determine a location, velocity, and/or orientation of the autonomous vehicle within the map(s) 234. In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the mapping component 232, a pose (e.g., a location and/or orientation) of the vehicle 202 relative to the environment (e.g., via a position and/or orientation relative to the map(s) 234) and/or sensor data associated therewith.

In some instances, perception component 228 may comprise a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 236 and/or drive component(s) 212 may parse/cause to be carried out, second instructions for the emitter(s) 208 may be formatted according to a second format associated therewith).

The memory 220 and/or 224 may additionally or alternatively store a collision avoidance system, a ride management system, etc. Although localization component 226, perception component 228, planning component 230, ML architecture 232, map(s) 234, and/or system controller(s) 236 are illustrated as being stored in memory 220, any of these components may include processor-executable instructions, ML model(s) (e.g., a neural network), and/or hardware and all or part of any of these components may be stored on memory 224 or configured as part of computing device(s) 214. In some examples, a mapping component running on the vehicle 202 may collect and/or encode sensor data (e.g., raw sensor data, sensor data alignment, perception-labeled sensor data), pose data, and/or perception data for transmission to the computing device(s) 214. The mapping component running on the vehicle and/or the computing device(s) 214 may conduct the operations discussed herein to generate a map based at least in part on a link modification.

In some examples, computing device(s) 214 (and/or 204) may comprise a training component 238. In some examples, the training component may comprise components for generating and/or collecting supervised, semi-supervised, and/or unsupervised training data from one or more autonomous vehicles and training the ML architecture 114 discussed herein.

The ML architecture 232 may operate on the vehicle 202 and/or on the computing device(s) 214. In some examples, the ML architecture 232 may be downstream (receive an output) from sensor(s) 206, the localization component 226, other components of the perception component 228 in a pipeline, and/or the planning component 230.

The localization component 226, the perception component 228, the planning component 230, the ML architecture 232, the training component 238, and/or other components of the system 200 may comprise one or more ML models. For example, the localization component 226, the perception component 228, the planning component 230, the ML architecture 232, and/or the training component 238 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 220 may additionally or alternatively store one or more system controller(s) 236, which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. The system controller(s) 236 may control operation of the vehicle 202 based at least in part on the instructions received from the planning component 230.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example ML Architecture and Associated Task Outputs

Figure 3A:
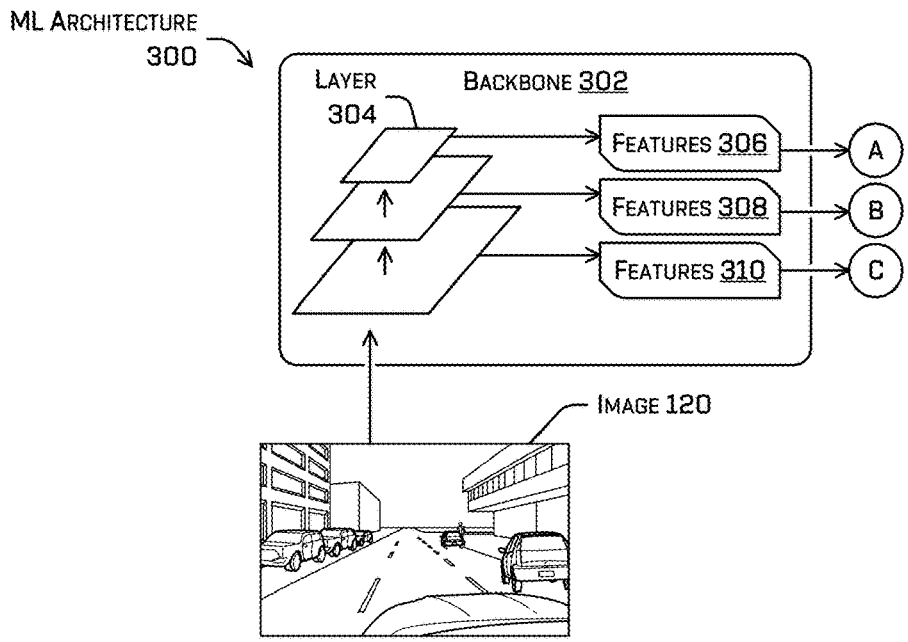
FIG. 3A illustrates a block diagram of a backbone component of the ML architecture discussed herein. The backbone component may generate features based at least in part on an image and the training of the layers of the backbone component.

FIG. 3A illustrates a block diagram of part of an example ML architecture 300, which may represent ML architecture 232 and/or ML architecture 114. ML architecture 300 may comprise a backbone component 302. The backbone component may comprise one or more layers, such as layer 304, which may comprise convolutional layers/filters, ReLU function(s), batch normalization(s), sub-sampling function(s), (e.g., maxpool, average pool, L2-norm), loss function(s)/feedback (at least during training), etc. In some examples, the example ML model 200 may comprise a neural network such as, for example, a convolutional network. Although discussed in the context of neural networks, any type of machine-learning may be used consistent with this disclosure. For example, machine-learning algorithms may include, but are not limited to, regression algorithms, instance-based algorithms, Bayesian algorithms, association rule learning algorithms, deep learning algorithms, etc. In at least one non-limiting example, the backbone component 302 may comprise a RetinaNet, VGG, ResNet network (e.g., ResNet50, ResNet101), and/or the like.

In some examples, each layer of the backbone component 302 may output a features, such as features 306-310. It is understood that although three features are shown, the number of features may depend, at least in part, on a number of layers of the backbone component 302. The backbone component 302 has three layers in this example, although it is understood that the backbone component 302 may have less or more. In some examples, one of the features, e.g., features 306, may comprise a feature map output by a layer. The features 306 may not be described in humanly-meaningful terms, as the function(s) of the layer may comprise an output that may be a computer and/or neural network transformation of the input thereto. As such, the functions may comprise a high-dimensional field of values generated by layer(s) of the respective components of the backbone component 302 (e.g., vectors and/or tensors of values representing intrinsic properties of the data determined based on the learned parameters of the layer that produced the vector(s) and/or tensor(s)).

In some examples, the backbone component 302 may receive image 120 and forward propagate the image 120 through one or more of the layer(s) of the backbone component 302 to determined features 306-310. In some examples, features 306-310 may have different resolutions and/or sizes, depending on the functions of the layers of the backbone component 302. For example, features 306 may have a smallest size and features 310 may have a largest size, compares to features 306-310. For example, a first layer may downsample an image in comparison with a previous layer. In some examples, a layer of the backbone may comprise a filter/kernel having one or more weights or a bias value associated therewith, depending on the dimensions of the filter/kernel and/or having one or more hyperparameters associated therewith. For example, the hyperparameters may comprise a dimension of the filter (e.g., which may determine the number of weights associated with the filter—for example, a 3×3 filter may comprise up to 9 weights for example), stride, padding, padding value (e.g., zero padding, one padding), a dilation rate, and/or the like.

Figure 3B:
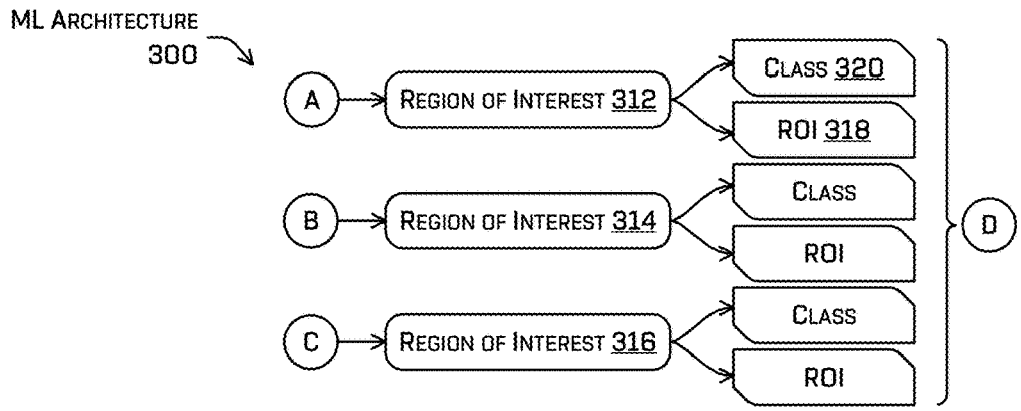
FIG. 3B illustrates a block diagram of region of interest (ROI)) components of the ML architecture associated with the layers of the backbone component. An ROI component may generate an ROI associated with an object detected in the image, a classification associated with ROI, and/or a confidence

FIG. 3B illustrates a block diagram of ROI component(s) 312-316 of the ML architecture 300. In some examples, the ROI component(s) 312-316 may each receive features from a different layer of the backbone component 302. For example, ROI component 312 may receive features 306 from layer 304 of the backbone component.

The ROI component(s) 312-316 may each be trained to determine an ROI and/or classification associated with an object. The ROI component(s) 312-316 may comprise a same ML model structure, such as a YOLO structure, and/or the same hyperparameters, although in additional or alternate examples, they may comprise different structure(s) and/or hyperparameters. The structure may define an order, type, and/or connectivity between sub-components of a component (e.g., a first convolutional layer receives raw sensor data, generates output therefrom, and provides the output to a first maxpool function, which provides output to a second convolutional layer, and so on). Hyperparameters associated with a component may define properties of the structure such as, for example, a number and/or dimension of filters within a convolutional layer and/or a spatial extent, stride, amount of padding, padding value (e.g., zero padding, fractional padding), input size (e.g., tensor, having dimensions $W_1 \times H_1 \times D_1$, or any other number of dimensions) and/or type (e.g., raw sensor data, tensor received from a previous component of the example ML model 200), output size and/or type (e.g., tensor having dimensions having dimensions $W_1 \times H_1 \times D_1$ or $W_2 \times H_2 \times D_2$) and/or the like associated with a component. A parameter, in contrast to a hyperparameter, may comprise any parameter that is modified during training such as, for example, a weight and/or bias associated with a layer or component(s) thereof, such as a filter. The different ROIs generated by the different ROI component(s) 312-316 may be different sizes based at least in part on the difference in resolution of the features 306-310. In some examples, the ROIs generated by the ROI component(s) 312-316 may be collected, redundant ROIs may be discarded, and the resultant ROIs forwarded to the next portion of the ML architecture 300.

Taking ROI component 312, for example, ROI component 312 may generate an ROI 318 and/or classification 320 (abbreviated "class" in the figures) based at least in part on features 306. In some examples, generating the ROI 318 may comprise determining a center and/or extents (e.g., dimensions) of a bounding shape, which may be based at least in part on an anchor associated with classification 320. Classification 320 may comprise a semantic classification associated with the ROI 318 and/or an anchor upon which the ROI 318 is based. In some examples, each classification may be associated with one or more anchors and the ROI 318 output by region of interest 312 may be an ROI 318 associated with a highest confidence from among multiple ROIs and confidences. For example ROI component 312 may select (e.g., using a non-maximum suppression (NMS) algorithm), for association with an object represented in the image, a first ROI from among a plurality of ROIs in a first feature map generated by the ROI component 312 based at least in part on the features 306 and/or of the features 306 themselves, and determine whether to associate the first ROI image. In some examples, the ROI component 312 may output the confidence associated with the ROI 318.

In some examples, an ROI component may comprise two sub-networks—one to determine a classification for each anchor and one to regress the ROI size with respect to each anchor. As used herein, a two-dimensional ROI may comprise a bounding box (or other shape), a classification, and/or a confidence.

Figure 3C:
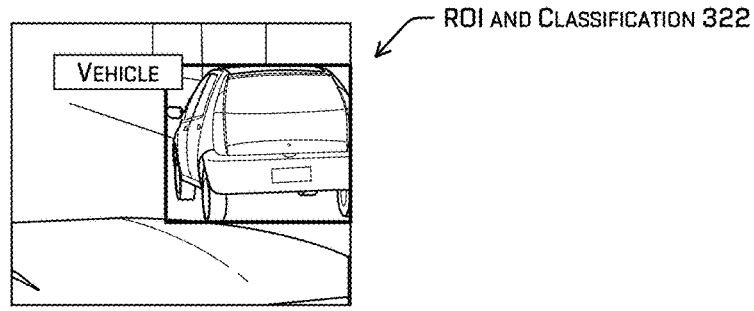
FIG. 3C illustrates an example of an ROI and classification associated with an object detected in the example image.

FIG. 3C depicts an example of an ROI and classification 322 associated with a vehicle detected from image 120. The ROI comprises a bounding rectangle in the depicted example, although the ROI may additionally or alternatively a mask or bounding shape of any other type, depending on the anchor shape.

Figure 4A:
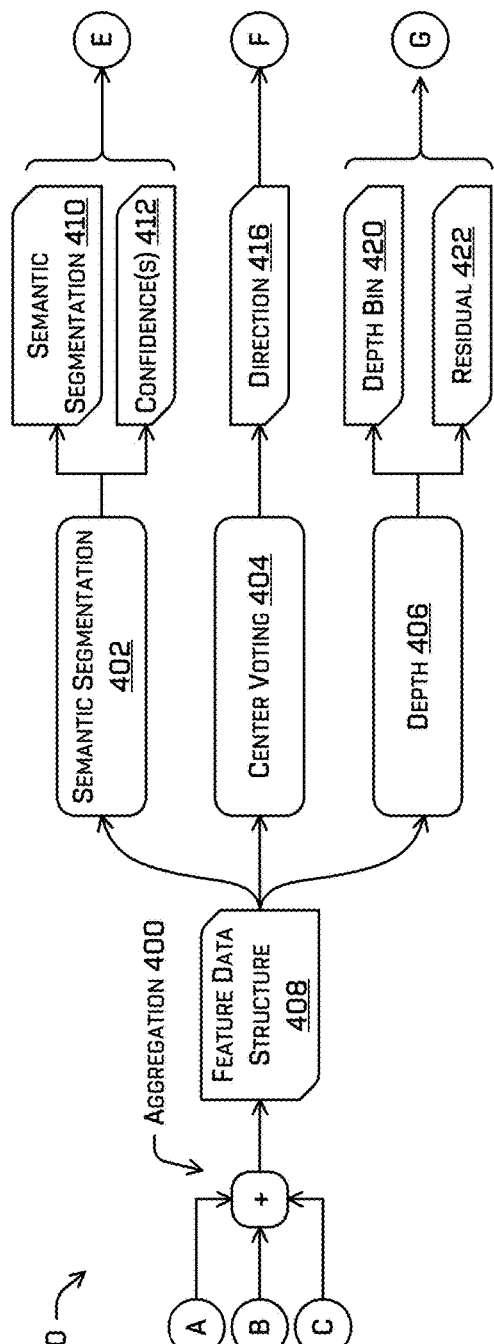
FIG. 4A illustrates a block diagram of additional or alternative components of the ML architecture, namely an aggregation component, semantic segmentation component, center voting component, and/or depth component.

Turning to FIG. 4A, FIG. 4A illustrates a block diagram of additional or alternative components of the ML architecture 300. For example, ML architecture 300 may comprise an aggregation component 400, semantic segmentation component 402, center voting component 404, and/or depth component 406. In some examples, ROI component(s) 312-316, semantic segmentation component 402, center voting component 404, and/or depth component 406 may be co-learned based at least in part on the joint learning techniques described herein. Features (e.g., 306-310) generated by the backbone component 302 may be received at an aggregation component 400.

The aggregation component 400 may upsample the features so that they have a common resolution (e.g., ⅛$^{th}$ scale of the image 120, or any other common scale) and determine an element-wise summation of the upsampled features. In some examples, an upsampling stage may comprise a convolution (e.g., using a 3×3 filter, which may comprise learned parameters, although other filter sizes are contemplated), batch normalization, ReLU, and 2× bilinear upsampling. Depending on the resolution of a set of features, the set of features may be passed through one or more upsampling stages to reach the common resolution. In an additional or alternate example, the features may be passed through a set of atrous convolutions, which may comprise learned parameters. The upsampling described above that does not include atrous convolution may achieve a sufficiently semantically meaningfully high resolution feature map and may reduce compute and memory usage compared to using atrous convolutions. In some examples, once the features have been upsampled to a common scale, the features may be summed together as a dense feature map.

The techniques may additionally or alternatively comprise a dense pixel-wise encoder that may increase the receptive field and/or further resolve edge(s) in the dense feature map by reducing a number of channels of the upsampled and summed features (e.g., using a 1×1 convolution to perform channel-wise pool), perform one or more atrous convolutions (e.g., at increasing dilation rates, e.g., three convolutions at the dilation rates of 2, 4, and 8, although any other number of convolutions or dilation rates may be used), and restore the number of channels by applying a 1×1 convolution, any convolutions of which may comprise different learned parameters. The result of these operations is feature data structure 408, which may be a dense feature map. This technique that may be employed in real-time and preserves a resolution of the features while increasing the receptive field of the ML model.

In some examples, the feature data structure 408 may be used by the semantic segmentation component 402, center voting component 404, and/or depth component 406. This shared data use may reduce compute and/or memory use. In some examples, semantic segmentation component 402, center voting component 404, and/or depth component 406 may each comprise a filter for projecting the feature data structure 408 into the task-specific outputs discussed herein.

Figure 4D:
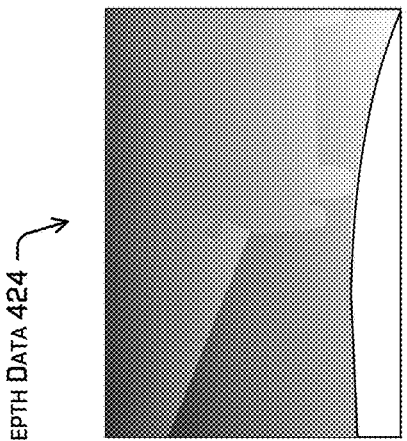
FIGS. 4B-4D illustrate examples of semantic segmentation, direction data, and depth data, respectively, determined by the ML architecture based at least in part on an example image.
Figure 4C:
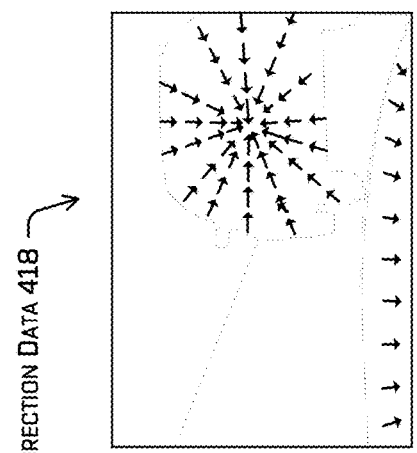
Figure 4B:
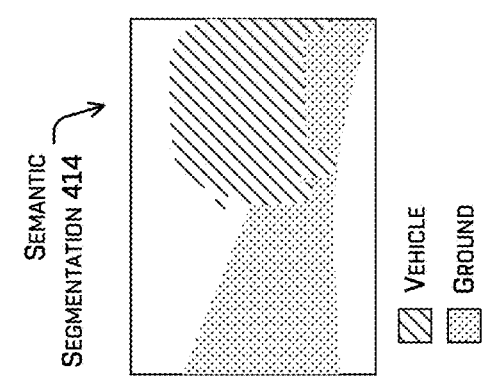

The semantic segmentation component 402 may determine a semantic segmentation 410 of the image 120 and/or confidence(s) 412 associated therewith. For example, the semantic segmentation may comprise a semantic label associated with a discrete portion of the image 120 (e.g., a per-pixel classification label) and/or a confidence indicating a likelihood that the classification is correct. For example, FIG. 4B depicts an example semantic segmentation 414 associated with a portion of image 120. In some examples, the semantic segmentation component 402 may comprise 1×1 convolution, 4× bilinear upsampling, and/or softmax layers to generate the semantic segmentation 410 and/or confidence(s) 412 (e.g., projecting the feature data structure 408 into the semantic segmentation and/or confidence space(s)). The example semantic segmentation 414 depicts a plurality of discrete portions (e.g., pixels) associated with the classification "vehicle" and a plurality of other discrete portions associated with the classification "ground." In some examples, the confidence may be indicated by a logit.

The center voting component 404 may determine direction data 416 based at least in part on the feature data structure 408, the direction data including a direction and/or confidence associated with a discrete portion of the image 120. In some examples, the confidence may be indicated by a logit, although other examples are contemplated, such as a probability. The direction may indicate a direction from the discrete portion to a nearest object center. FIG. 4C depicts example direction data 418 comprising a very limited number of direction logits associated with respective discrete portions of a portion of image 120. Note that the grayed lines would not appear in direction data and only appear for visual reference.

The depth component 406 may determine a depth bin 420 and/or a depth residual 422 associated with a discrete portion of the image 120. In some examples, the depth bin may comprise a ranges of distances from an image sensor and/or a center (and/or any other midpoint) of the bin. In some examples, determining the depth bin 420 may be a classification task, whereas determining the depth residual may be a regression task. In some examples, the depth residual may be based at least in part on the depth bin. The depth residual may comprise an offset from a reference point associated with the depth bin, such as, for example, a center of the depth bin or an end of the depth bin. FIG. 4D depicts example depth data 424 determined by depth component 406 in association with image 120. In some examples, depth component 406 may sum a center of the output depth bin 420 with the residual 422 as the final depth.

In non-limiting example to further illustrate, the depth component 406 may quantize (discretize) a depth interval, [α,β], into K non-overlapping discrete depth bins. In some examples, the quantization may be conducted in log space, inverse depth space, or in linear space, although log space is discussed herein. Setting the depth bins in log space may have the effect of down-weighting training losses in regions with large depth values, which may be more inaccurate since images generally contain less information about distant object (e.g., see the output 122). In at least one non-limiting example, an edge of a bin may be defined according to $$t_i = \exp\left(\log\alpha + \frac{\log\left(\frac{\beta}{\alpha}\right) * i}{K}\right) \quad (1)$$

where $t_i \in \{t_i, \ldots, t_{K-1}\}$ are the K edges and $t_{i+1}$ is the corresponding edge on the other end of the bin. If a ground truth depth for a pixel is $g_d$, it may be assigned the bin index $i \in \{0, \ldots, K-1\}$ if and only if $g_d \in [t_i, \ldots, t_{i+1})$. In some examples, the regression may be based at least in part on a midpoint. The midpoint of the i-th bin in log space may be defined as:

$$m_i = \frac{\log(t_i + 1) + \log(t_i)}{2} \quad (2)$$

For a ground truth depth $g_d$ that falls in bin i, the ground truth residual $r_d$ may be computed as:

$$r_d = \frac{(\log(g_d) - m_i)}{\log(t_{i+1}) - \log(t_i)} \quad (3)$$

At inference time, the depth component 406 may apply a convolution (e.g., using a 1×1 filter, which may comprise learned parameters, although other filter sizes are contemplated) to the feature data structure 408 to produce K softmax logits $l_0, \ldots, l_{K-1}$ per pixel corresponding to the likelihood that the depth at that pixel falls in the corresponding depth bin (e.g., $[t_i, t_{i+1}]$ for logit $l_i$). In some examples, the depth component 406 may conduct a parallel computation to produce the residuals. For example, the depth component 406 may convolve the feature data structure 408 (e.g., using a 1×1 filter, which may comprise learned parameters, although other filter sizes are contemplated), producing K predicted residuals, $r_0, \ldots, r_{K-1}$ per pixel. In some examples, the depth component 406 may not impose a limit on the predicted residual values, although in other examples, the depth component 406 may limit the predicted residual, such as to limit the predicted residual to half of the bin width and/or the like.

In an example using log space, determining a depth value for a particular pixel and for a particular bin, i, may comprise evaluating the following equation:

$$d_i = \exp(m_i + r_i(\log(t_{i+1}) - \log(t_i)))  \quad (4)$$

In some instances, to select a depth, $d_i$ from among the bins to associate with a pixel, the depth component 406 may select the depth with the largest logit, $l_i$. The depth component 406 may additionally or alternatively smooth this depth based at least in part on the depth values of associated with logits in the local neighborhood. For example, the smoothing can be based at least in part on a probability distribution determined from the logits in the local neighborhood. The local neighborhood may be defined as, for example, $N=(\hat{i}-1, \hat{i}, \hat{i}+1)$, although the neighborhood could be defined more broadly, and the smoothing may be defined as $$\sum_{j \in N} P_j d_j \text{ where } P_j = \frac{\exp(l_j)}{\sum_{K \in N} \exp(l_j)}.$$

In some examples, the depth component 406 operations discussed herein may reduce a "trail" artifact. This may be because choosing a depth bin with a highest logit allows selection of a single mode of a potentially multi-modal depth distribution at each pixel. The pixels may thereby be implicitly assigned either the background depth or the object depth.

Turning to FIG. 5A, FIG. 5A illustrates a block diagram of additional or alternative components of the ML architecture 300, namely a cropping and/or pooling component 500 and/or an instance segmentation component 502. In some examples, the cropping and/or pooing component 500 may receive an ROI (at D) and determine portions of (e.g., crop and/or pool) the semantic segmentation 410, direction data 416, and/or depth data 420 and/or 422 associated with the ROI. The cropping and/or pooling component 500 may upsample any of the resultant portions that are not in a common resolution and concatenate the portions together (at 504). In some examples, the cropping and/or pooling component 500 may determine a confidence associated with the crop of the semantic segmentation 410 based at least in part on a summed area table. In some examples, applying a summed area table to the crop of the semantic segmentation 410 may determine a representative confidence that indicates an approximation of the average confidence of the confidences associated with the crop of the semantic segmentation 410. In an additional or alternate example, the cropping and/or pooling component 500 may determine an average confidence associated with the crop of the semantic segmentation 410. In some examples, the representative or average confidence may be used during training and/or during inference.

In some examples, the instance segmentation component 502 may generate an instance segmentation 506 based at least in part on the cropped portion of semantic segmentation 410, direction data 416, and/or depth data 420 and/or 422. In some examples, the instance segmentation component 502 may convolve (e.g., using a 1×1 filter, which may comprise learned parameters) the semantic segmentation 410, direction data 416, and/or depth data 420 and/or 422 to determine a binary indication of whether or not an object is detected. For example, FIG. 5B illustrates an example instance segmentation 508. Unlike semantic segmentation that differentiates between classifications of objects or ROIs that indicate a shape that bounds an object, the instance segmentation 508 may comprise a binary indication that an object is detected or is not detected.

In a first non-limiting example, the instance segmentation component 502 may determine the instance segmentation 506 based at least in part on semantic segmentation data 410 and direction data 416. For example, the instance segmentation component 502 may select a channel associated with a classification (e.g., a pedestrian channel) from the semantic segmentation, and crop the regions based at least in part on an ROI output in the pedestrian channel. The instance segmentation component 502 may gather (e.g., pool) regional direction logits from the direction channels and use the cropped semantic segmentation logits along with the pooled direction logits to conduct foreground/background segmentation. In a second non-limiting additional or alternate example, the instance segmentation component 502 may determine the instance segmentation 506 based at least in part on substituting the depth data 420 and/or 422 for semantic segmentation 410 in the operation described in the first non-limiting example. In a third non-limiting example, the instance segmentation component 502 may determine the instance segmentation 506 based at least in part on semantic segmentation data 410, direction data 416, and depth data 420 and/or 422. In such an example, each of the cropped (and/or pooled) portions thereof may by concatenated and convolved (e.g., using a 1×1 filter, which may comprise learned parameters).

FIG. 5C illustrates a block diagram of additional or alternative components of the ML architecture 300, namely a cropping and/or pooling component 510 and/or a three-dimensional ROI component 512. Cropping and/or pooling component 510 may be a same or different component as cropping and/or pooling component 500, either of which may respectively be part of instance segmentation 502 and/or three-dimensional ROI component 512. In some examples, the data cropped and/or pooled by cropping and/or pooling component 500 for the instance segmentation may be provided to cropping and/or pooling component 510 along with the instance segmentation 502 and image 120. The same ROI used to crop and/or pool the data at cropping and/or pooling component 500 may be used to crop the image 120 and/or the instance segmentation 506, each or either of which may be upsampled and/or concatenated (at 514) to the portion of semantic segmentation data 410, direction data 416, and depth data 420 and/or 422 upsampled and concatenated at 504.

The three-dimensional ROI component 512 may comprise one or more convolutional layers, which may comprise a filter comprising learned parameters. The three-dimensional ROI component 512 may generate a three-dimensional ROI 516 based at least in part on the cropped, pooled, upsampled, and/or concatenated image, instance segmentation, semantic segmentation data 410, direction data 416, and/or depth data 420 and/or 422.

FIG. 5D illustrates an example of a three-dimensional ROI 518 determined by the three-dimensional ROI component 512. The three-dimensional ROI 518 in the depicted example is a three-dimensional bounding box. In some examples, the three-dimensional bounding box may comprise a location, orientation, pose (e.g., orientation), and/or size (e.g., length, width, height, etc.) associated with the object identified thereby.

Example Process

Figure 6:
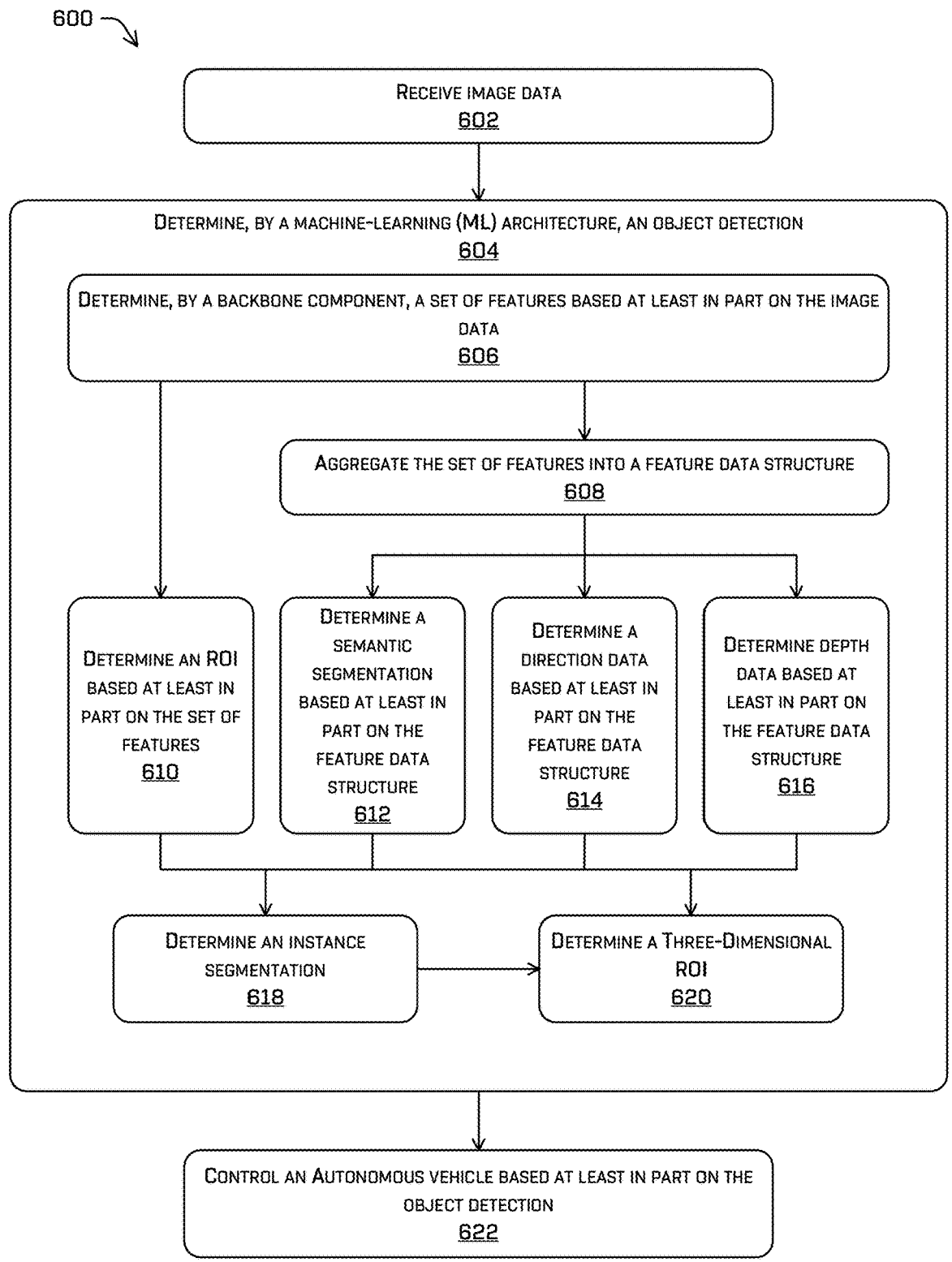
FIG. 6 illustrates a flow diagram of an example process for generating an object detection using the ML architecture discussed herein and/or controlling an autonomous vehicle based at least in part on the object detection.

FIG. 6 illustrates a flow diagram of an example process 600 for generating an object detection using the ML architecture discussed herein and/or controlling an autonomous vehicle based at least in part on the object detection. In some examples, example process 600 may be executed by a perception component 228 and/or the ML architecture 300.

At operation 602, example process 600 may comprise receiving image data, according to any of the techniques discussed herein. The image data may be inputted to the ML architecture discussed herein.

At operation 604, example process 600 may comprise determining an object detection by the ML architecture, according to any of the techniques discussed herein. In some examples, the object detection may comprise an ROI, classification, semantic segmentation, depth data, instance segmentation, and/or three-dimensional ROI. Determining the object detection may comprise one or more operations (e.g., at least one of operations 606-622) discussed herein accomplished by different portions of the ML architecture, which may comprise a pipeline of components.

At operation 606, example process 600 may comprise determining, by a backbone component, a set of features based at least in part on the image data, according to any of the techniques discussed herein. The set of features may be one or more feature maps (e.g., at different resolutions) where a feature of a feature map may comprise a value associated with a portion of the image data. For example, the backbone component may comprise a RetinaNet, VGG, ResNet network (e.g., ResNet50, ResNet101), and/or the like, and the set of features may be one or more feature maps, each of which may be output by a different layer of the backbone component.

At operation 608, example process 600 may comprise aggregating the set of features into a feature data structure, according to any of the techniques discussed herein. For example, the set of features may comprise one or more feature maps of different resolutions. Aggregating the set of features may comprise scaling the one or more feature maps into a common resolution and element-wise summing the scaled feature maps into the feature data structure. Additionally or alternatively to the element-wise summing, the techniques may comprise a dense pixel-wise encoding comprising downsampling the element-wise summed feature maps (e.g., using a 1×1 convolution to channel-wise pool), determining one or more atrous convolution using increasing dilation rates, and/or upsampling the resultant feature map. In some examples, the resultant feature data structure map be provided to one or more components of the ML architecture. For example, the feature data structure may be provided as input to an ROI component, semantic segmentation component, center voting component, instance segmentation component, and/or three-dimensional ROI component.

At operation 610, example process 600 may comprise determining an ROI based at least in part on the set of features determined by the backbone component, according to any of the techniques discussed herein. In some examples, an ROI component may generate a two-dimensional ROI, classification, and/or confidence score associated with a region of the image that the ROI indicates as being occupied by a detected object. In some examples, an ROI component may be associated with each layer of the backbone component and may generate ROI(s) associated with different sizes/resolutions. For example, a first ROI component may detect small objects, a second ROI component may detect larger objects, and so on. Other techniques are contemplated however.

At operation 612, example process 600 may comprise determining a semantic segmentation based at least in part on the feature data structure, according to any of the techniques discussed herein. In some examples, the semantic segmentation may identify a region of the image as being associated with a classification (e.g., bike, pedestrian, vehicle). A semantic segmentation portion of the ML architecture may accomplish operation 612, which may additionally or alternatively comprise determining a confidence in association with a discrete portion (e.g., a pixel) of the semantic segmentation. In some examples, the semantic segmentation portion may comprise an output head comprising a 1×1 convolution, 4× bilinear upsampling, and softmax layers to generate per-pixel classifications at an original image resolution, although other configurations are contemplated. Note that the 1×1 convolution may comprise learned parameters that are trained according to the techniques discussed herein and the 1×1 convolution may alternatively be a filter of another size.

At operation 614, example process 600 may comprise determining direction data based at least in part on the feature data structure, according to any of the techniques discussed herein. A center voting portion of the ML architecture may generate the direction data based at least in part on the feature data structure.

At operation 616, example process 600 may comprise determining depth data based at least in part on the feature data structure, according to any of the techniques discussed herein. In some examples, a depth portion of the ML architecture may apply a 1×1 convolution to the feature data structure to produce K softmax logits per pixel corresponding to the likelihood that the depth at that pixel falls into a corresponding depth bin for that logit. Note that the 1×1 convolution may comprise learned parameters that are trained according to the techniques discussed herein and the 1×1 convolution may alternatively be a filter of another size. The depth portion may apply an additional or alternative 1×1 convolution to the feature data structure to predict residuals per pixel. Note that the 1×1 convolution may comprise learned parameters that are trained according to the techniques discussed herein and the 1×1 convolution may alternatively be a filter of another size. The depth may be predicted according to Equation (4) above for a log-space estimation. In some examples, the depth bin associated with a maximum likelihood may be selected for association with a pixel and/or the depth indicated by that depth bin may be smoothed based at least in part on depths indicated by pixels in a region surrounding the pixel.

At operation 618, example process 600 may comprise determining an instance segmentation based at least in part on the ROI, semantic segmentation, direction data, and/or depth data, according to any of the techniques discussed herein. In some examples, the ROI may be used to crop the semantic segmentation, direction data, and/or depth data. Depending on the implementation the instance segmentation may be determined based at least in part on the (cropped) semantic data and direction data and in a first example, the (cropped) depth data and direction data in a second example, and/or the (cropped) depth data, semantic data, and direction data in a third example, although any other combination is contemplated. According to the third example, the semantic segmentation logits of the predicted class, the direction logits, and the depth logits associated with an ROI may be concatenated using a 1×1 convolution to estimate the instance mask. Note that the 1×1 convolution may comprise learned parameters that are trained according to the techniques discussed herein and the 1×1 convolution may alternatively be a filter of any other size.

At operation 620, example process 600 may comprise determining a three-dimensional ROI, according to any of the techniques discussed herein. For example, determining the three-dimensional ROI may be based at least in part on the semantic segmentation, depth data, direction data, and instance segmentation associated with an ROI.

At operation 622, example process 600 may comprise controlling an autonomous vehicle based at least in part on the object detection, according to any of the techniques discussed herein. For example, the autonomous vehicle may determine a trajectory or other commands for controlling motion or other operations of the autonomous vehicle based at least in part on the ROI, semantic segmentation, depth data, instance segmentation, and/or three-dimensional ROI.

Figure 7:
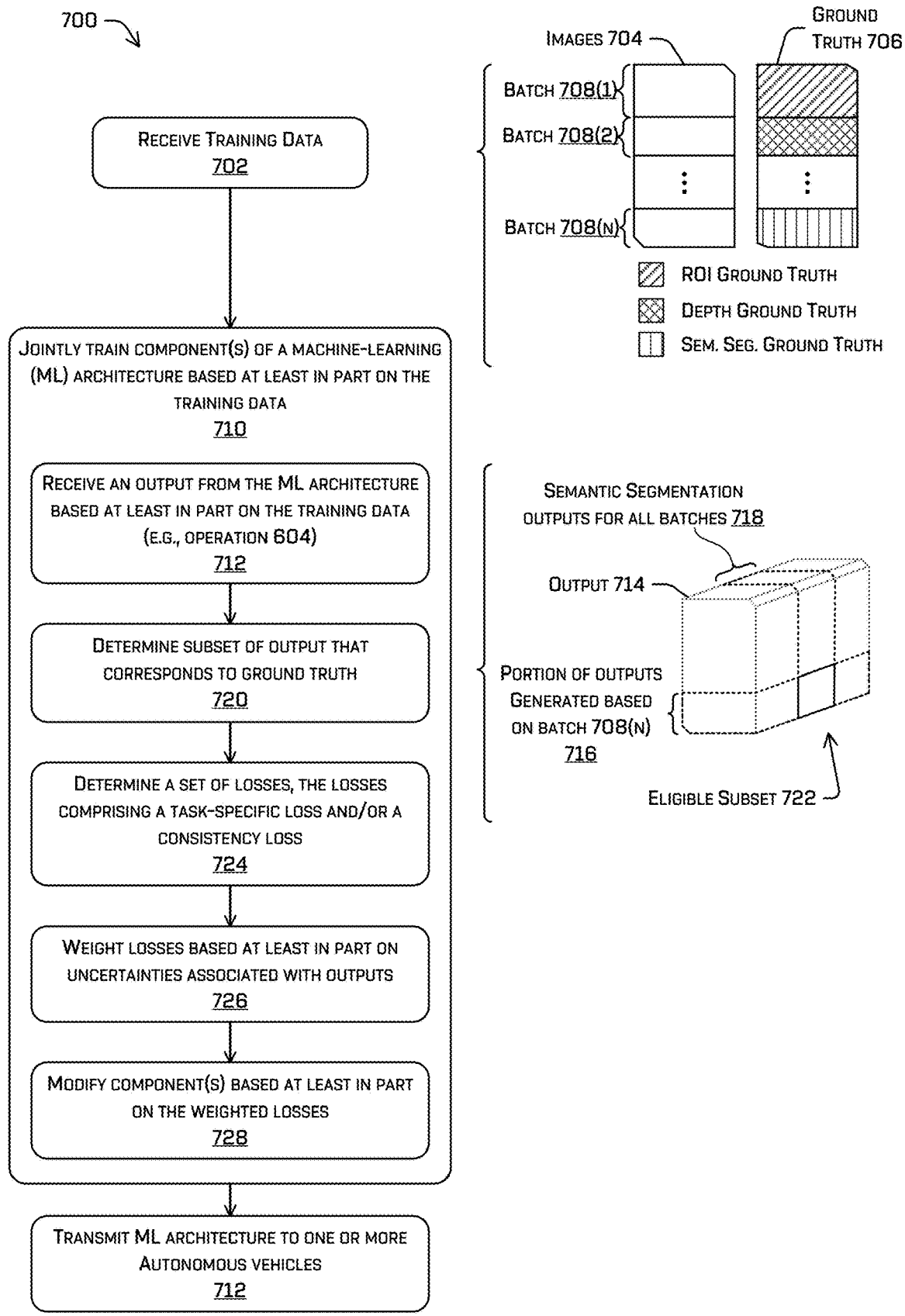
FIG. 7 illustrates a flow diagram of an example process for training the ML architecture discussed herein.

FIG. 7 illustrates a flow diagram of an example process 700 for training the ML architecture discussed herein. In some examples, example process 700 may be executed by a perception component 228, the ML architecture 300, and/or a training component 238.

At operation 702, example process 700 may comprise receiving training data, according to any of the techniques discussed herein. For example, the training data may comprise images 704 and ground truth 706 associated therewith. In some examples, ground truth may not be available for each type of task accomplished by the ML architecture. For example, images available for use as training data may have previously been labeled with a ground truth ROI and ground truth semantic classification, but not a ground truth instance segmentation, depth data, direction data, and/or three-dimensional ROI.

In such an example, the training data may comprise batches, wherein each batch is associated with different ground truth. For example, a first batch 708(1) of the training data may include images associated with ROI ground truth data, a second batch 708(2) may include images associated with depth ground truth data (e.g., lidar data), and/or an n-th batch 708(n) may include images associated with semantic segmentation ground truth data.

In some examples, the ground truth included in the training data may be supervised ground truth data (e.g., human and/or machine labeled), semi-supervised (e.g., only a subset of data is labeled), and/or unsupervised (e.g., where no labels are provided). In some instances, ground truth data may be sparse, such as when lidar data is used as ground truth data to determine a loss associated with depth data generated by a depth component of the ML architecture discussed herein. Such data may be an example of semi-supervised learning. The techniques remedy this and make sensor measurements a useful source of ground truth data by associating a respective sensor measurement with a group of (denser) output data generated by the ML architecture. See U.S. patent application Ser. No. 16/684,554, filed on Nov. 14, 2019, the entirety of which is incorporated herein; and U.S. patent application Ser. No. 16/684,568, filed on Nov. 14, 2019, the entirety of which is incorporated herein.

At operation 710, example process 700 may comprise jointly training component(s) of the ML architecture based at least in part on the training data, according to any of the techniques discussed herein.

At operation 712, example process 700 may comprise transmitting the ML architecture to one or more autonomous vehicles, according to any of the techniques discussed herein.

Jointly training component(s) of the ML architecture (operation 710) may further comprise the sub-operations discussed herein. Jointly training the component(s) may comprise determining a joint loss that is based on the outputs of each of the component(s) and backpropagating the joint loss through the entire ML architecture such that parameters of the different components are altered to minimize the joint loss. Additionally or alternatively, joint training may comprise enforcing consistency between the losses composing the joint loss.

At operation 708, jointly training the ML architecture may comprise receiving an output from the ML architecture based at least in part on the training data. Receiving the output from the ML architecture may be based at least in part on providing an image as input to the ML architecture and the received output may be based at least in part on operation 604. In some examples, receiving an output from the ML architecture may comprise receiving an ROI, classification, semantic segmentation, direction data, depth data, instance segmentation, and/or three-dimensional ROI, each of which may be referred to as a respective output of the different portions of the ML architecture. Such an output may be received for each of the images 704 of the training data. For example, the output 714 received from the ML architecture responsive to providing the images 704 to the ML architecture may be a high-dimension data structure that includes a dimension and/or other portion that is associated with a batch (e.g., portion 716 may be associated with batch 708(n)) and outputs of a particular component may be associated with another portion of that data structure (e.g., portion 718 may be the portion of the output 714 associated with the semantic segmentation task across all batches).

At operation 720, example operation 710 may comprise determining a subset of the output 710 that corresponds to ground truth available for a particular task. For example, operation 720 may comprise determining a subset 722 of the output 714 eligible for generating a semantic segmentation loss. For example, this may comprise determining a subset of the output 714 that was generated based at least in part on images for which semantic segmentation ground truth was available (i.e., batch 708(n) in the depicted example, corresponding to portion 716) and determining a dimension of the output that indicates a semantic segmentation (i.e., portion 718). In some examples, operation 720 may be used when ground truth is not available for every task type per image. In other words, each image is not associated with ground truth data associated with each component of the ML architecture that generates an output.

Regardless, at operation 724, example operation 710 may comprise determining a set of losses associated with the different tasks. In some examples, determining the losses may comprise determining task-specific losses and enforcing consistency across one or more of the losses. The task-specific losses may then be summed into a joint loss, which maybe backpropagated through the ML architecture.

For example, determining the task-specific losses may comprise determining: classification loss(es), $\mathcal{L}_c$, and/or regression loss(es), $\mathcal{L}_b$, (e.g., with respect to the anchors), which may be determined with respect to the two and/or three-dimensional ROIs; a pixel-wise loss for classifying each pixel into one of the semantic classes (for the semantic segmentation data), $\mathcal{L}_s$; a classification loss (if the direction logits are binned) and/or regression loss for the direction logits, $\mathcal{L}_d$; a classification loss for the depth bins, $\mathcal{L}_m$; and a regression loss for the depth residuals, $\mathcal{L}_r$; and/or an instance mask loss that may be applied after the instance segmentation loss, which may be a binary cross entropy loss, $\mathcal{L}_i$. In some examples, each of these losses may be summed to form a joint loss.

In some examples, consistency may be enforced across the parameters using weights so that the joint loss is not skewed by one task's training:

$$\mathcal{L}_{total} = \Sigma_t T_t \lambda_t \mathcal{L}_t \qquad (5)$$

where $\lambda_t$ is the weight associated with the t-th task and $\mathcal{L}_t$ is the loss determined for the t-th task. In the example discussed above $t \in \{c, b, s, d, m, r, i\}$.

In an additional or alternate example, the components of the ML architecture may each output an additional parameter, a measure of uncertainty ($\sigma_t$), for each task, $t \in [1, \ldots, T]$. In such an example, at operation 726, example operation 710 may comprise weighting a loss of the set of losses. In some examples, for stability the uncertainty may be defined in log space as $s_t = \log \sigma_t^2$. The modified (weighted) total loss function for training may be given by:

$$\mathcal{L}_{total}^h = \sum_t \tau_t \exp(-s_t) \mathcal{L}_t + \frac{s_t}{2} \qquad (6)$$

$$\tau_t = \begin{cases} 1 & \text{if } t \text{ is a classifacation task} \\ 0.5 & \text{if } t \text{ is a regression task} \end{cases} \qquad (7)$$

Additionally or alternatively, a consistency loss may be added to the loss. Enforcing consistency may comprise determining a difference between a first output and a second output and determining a loss based at least in part on the difference. For example, a difference may be determined between a semantic segmentation and depth data, a two-dimensional ROI and a three-dimensional ROI, a semantic segmentation and a classification, depth data and a three-dimensional ROI, and/or other combinations of the outputs discussed herein. Additionally or alternatively enforcing consistency may comprise driving confidences to be similar. For example, an ROI component may output a two-dimensional ROI and a confidence associated therewith and a semantic segmentation component may output a semantic segmentation indicating a collection of pixels of an image that are associated with a same classification and respective confidences associated with each pixel. The techniques may comprise determining an average confidence or a representative confidence (e.g., an approximated average determined using a summed-area table over the confidences associated with the semantic segmentation) associated with the semantic segmentation and determining a consistency loss based at least in part on a difference between the average and/or representative confidence associated with the semantic segmentation and the confidence associated with the two-dimensional ROI. Of course, any number of consistency losses may be used.

At operation 728, example operation 710 may comprise modifying component(s) of the ML architecture to minimize the joint loss determined at operation(s) 722 and/or 724. The joint loss may be backpropagated through ML architecture 300, which may comprise adjusting zero or more parameters of each component discussed herein to reduce the joint loss.

Example Clauses

A. A method comprising: receiving image data; inputting at least a portion of the image data into a machine-learning (ML) model; determining, by the ML model, a region of interest (ROI) associated with an object that appears in the image; determining, by the ML model and based at least in part on the ROI, additional outputs, the additional outputs comprising: a semantic segmentation associated with the object, the semantic indicating a classification of the object; directional data that indicates a center of the object; depth data associated with at least the portion of the image; and an instance segmentation associated with the object; determining a consistency loss based at least in part on two or more of the ROI, the semantic segmentation, the directional data, the depth data, or the instance segmentation; altering, as a trained ML model and based at least in part on the consistency loss, one or more parameters of the ML model; and transmitting the trained ML model to an autonomous vehicle.

B. The method of paragraph A, wherein: determining the ROI is based at least in part on: determining a first set of features associated with a first resolution; and determining a second set of features associated with a second resolution, wherein determining the additional outputs is further based at least in part on the first set of features and the second set of features.

C. The method of either paragraph A or B, further comprising determining, by the ML model and based at least in part on two or more of the ROI, the semantic segmentation, the directional data, the depth data, or the instance segmentation, a three-dimensional ROI associated with the object.

D. The method of any one of paragraphs A-C, wherein the determining the consistency loss comprises: determining, based at least in part on at least one of the semantic segmentation, depth data, instance segmentation, or the three-dimensional ROI, a two-dimensional bounding region; and determining a difference between the ROI and the two-dimensional bounding region.

E: The method of any one of paragraphs A-D, wherein the depth data comprises a depth bin output indicative of a discrete depth and a depth residual indicative of an offset from the depth bin.

F. A system comprising: one or more processors; and a memory storing computer-executable instructions that, when executed by the one or more processors, cause the system to perform operations comprising: receiving image data; inputting at least a portion of the image data into a machine-learning (ML) model; determining, by the ML model, a region of interest (ROI) associated with an object that appears in the image; determining, by the ML model and based at least in part on the ROI, additional outputs, the additional outputs comprising: a semantic segmentation associated with the object, the semantic indicating a classification of the object; depth data associated with at least the portion of the image; and an instance segmentation associated with the object; determining a consistency loss based at least in part on two or more of the ROI, the semantic segmentation, the depth data, or the instance segmentation; and altering, as a trained ML model and based at least in part on the consistency loss, one or more parameters of the ML model.

G. The system of paragraph F, wherein: determining the ROI is based at least in part on: determining a first set of features associated with a first resolution; and determining a second set of features associated with a second resolution, wherein determining the additional outputs is further based at least in part on the first set of features and the second set of features.

H. The system of either paragraph F or G, wherein the operations further comprise determining directional data that indicates a center of the object, and wherein determining the instance segmentation is based at least in part on the semantic segmentation, the depth data, and the directional data.

I. The system of any one of paragraphs F-H, wherein the operations further comprise: determining directional data that indicates a center of the object; and determining a three-dimensional ROI based at least in part on the semantic segmentation, the depth data, the directional data, and the instance segmentation.

J. The system of any one of paragraphs F-I, wherein the determining the consistency loss comprises determining a difference between the depth data and bounds of the three-dimensional ROI.

K. The system of any one of paragraphs F-J, wherein the determining the consistency loss comprises: determining, based at least in part on one or more of the semantic segmentation, depth data or instance segmentation, a two-dimensional bounding region; and determining a difference between the ROI and the two-dimensional bounding region.

L. The system of any one of paragraphs F-K, wherein the operations further comprise determining a certainty associated with at least one of the semantic segmentation, the depth data, and the instance segmentation, and wherein the consistency loss is further based at least in part on the uncertainty.

M. A non-transitory computer-readable medium storing computer-executable instructions that, when executed by one or more processors, cause the one or more processors to perform operations comprising: receiving image data; inputting at least a portion of the image data into a machine-learning (ML) model; determining, by the ML model, a region of interest (ROI) associated with an object that appears in the image; determining, by the ML model and based at least in part on the ROI, additional outputs, the additional outputs comprising: a semantic segmentation associated with the object, the semantic indicating a classification of the object; depth data associated with at least the portion of the image; and an instance segmentation associated with the object; determining a consistency loss based at least in part on two or more of the ROI, the semantic segmentation, the depth data, or the instance segmentation; and altering, as a trained ML model and based at least in part on the consistency loss, one or more parameters of the ML model.

N. The non-transitory computer-readable medium of paragraph M, wherein: determining the ROI is based at least in part on: determining a first set of features associated with a first resolution; and determining a second set of features associated with a second resolution, wherein determining the additional outputs is further based at least in part on the first set of features and the second set of features.

O. The non-transitory computer-readable medium of either paragraph M or N, wherein the operations further comprise determining directional data that indicates a center of the object, and wherein determining the instance segmentation is based at least in part on the semantic segmentation, the depth data, and the directional data.

P. The non-transitory computer-readable medium of any one of paragraphs M-O, wherein the operations further comprise: determining directional data that indicates a center of the object; and determining a three-dimensional ROI based at least in part on the semantic segmentation, the depth data, the directional data, and the instance segmentation.

Q. The non-transitory computer-readable medium of any one of paragraphs M-P, wherein the determining the consistency loss comprises determining a difference between the depth data and bounds of the three-dimensional ROI.

R. The non-transitory computer-readable medium of any one of paragraphs M-Q, wherein the determining the consistency loss comprises: determining, based at least in part on one or more of the semantic segmentation, depth data or instance segmentation, a two-dimensional bounding region; and determining a difference between the ROI and the two-dimensional bounding region.

S. The non-transitory computer-readable medium of any one of paragraphs M-R, wherein the operations further comprise determining a certainty associated with at least one of the semantic segmentation, the depth data, and the instance segmentation, and wherein the consistency loss is further based at least in part on the uncertainty.

T. The non-transitory computer-readable medium of any one of paragraphs M-S, wherein the depth data comprises a depth bin output indicative of a discrete depth and a depth residual indicative of an offset from the depth bin.

U. A system comprising: one or more processors; and a memory storing processor-executable instructions that, when executed by the one or more processors, cause the system to perform operations comprising: receiving an image from an image sensor associated with an autonomous vehicle; inputting at least a portion of the image into a machine learned (ML) model; determining, by the ML model, a set of outputs, the set of outputs comprising: a region of interest (ROI) associated with an object that appears in the image; a semantic segmentation associated with the object, the semantic segmentation indicative of a classification of the object; directional data that indicates a center of the object; depth data associated with at least the portion of the image; and an instance segmentation associated with the object; and controlling the autonomous vehicle based at least in part on at least one of the ROI, the semantic segmentation, the instance segmentation, or the depth data.

V. The system of paragraph U, wherein determining the set of outputs comprises: determining a first set of features associated with a first resolution; determining a second set of features associated with a second resolution, the first resolution differing from the second resolution; upsampling, as an upsampled features, the second features to have a same resolution as the first resolution; and combining, as combined features, the upsampled features with the first features, wherein at least one of the semantic segmentation, depth data, directional data, or instance segmentation is based at least in part on the combined features.

W. The system of either paragraph U or V, wherein the set of outputs further comprises a three-dimensional ROI.

X. The system of any one of paragraphs U-W, wherein determining the depth data comprises: determining, a depth bin from among a set of depth bins, the depth bin associated with a discrete portion of the environment; and determining a depth residual associated with the depth bin the depth residual indicating a deviation of a surface associated with the discrete portion from a position associated with the depth bin.

Y. The system of any one of paragraphs U-X, wherein determining the depth bin comprises: determining a smoothed set of logits based at least in part on determining an average or probability distribution of logits of other discrete portions in a region surrounding the discrete portion; and selecting the depth bin from among the set of depth bins based at least in part on determining the depth bin is associated with a maximum smoothed logit value among the smoothed set of logits.

Z. A method comprising: receiving an image from an image sensor associated with an autonomous vehicle; inputting at least a portion of the image into a machine learned (ML) model; determining, by the ML model, a set of outputs, the set of outputs comprising: a semantic segmentation associated with the object; depth data associated with at least the portion of the image; and an instance segmentation associated with the object; and controlling the autonomous vehicle based at least in part on at least one of the ROI, the semantic segmentation, the instance segmentation, or the depth data.

AA. The method of paragraph Z, wherein determining the set of outputs comprises: determining a first set of features associated with a first resolution; determining a second set of features associated with a second resolution, the first resolution differing from the second resolution; upsampling, as an upsampled features, the second features to have a same resolution as the first resolution; and combining, as combined features, the upsampled features with the first features, wherein at least one of the semantic segmentation, depth data, or instance segmentation is based at least in part on the combined features.

AB. The method of either paragraph Z or AA, wherein the set of outputs further comprises a three-dimensional ROI.

AC. The method of any one of paragraphs Z-AB, wherein: the set of outputs further comprises directional data that indicates a center of the object; and determining the three-dimensional is based at least in part on the semantic segmentation, the depth data, the directional data, and the instance segmentation.

AD. The method of any one of paragraphs Z-AC, wherein determining the depth data comprises: determining, a depth bin from among a set of depth bins, the depth bin associated with a discrete portion of the environment; and determining a depth residual associated with the depth bin the depth residual indicating a deviation of a surface associated with the discrete portion from a position associated with the depth bin.

AE. The method of any one of paragraphs Z-AD, wherein determining the depth bin comprises: determining a smoothed set of logits based at least in part on determining an average or probability distribution of logits of other discrete portions in a region surrounding the discrete portion; and selecting the depth bin from among the set of depth bins based at least in part on determining the depth bin is associated with a maximum smoothed logit value among the smoothed set of logits.

AF. The method of any one of paragraphs Z-AE, wherein: the set of outputs further comprises directional data that indicates a center of the object; and determining the instance segmentation is based at least in part on the semantic segmentation, the depth data, and the directional data.

AG. A non-transitory computer-readable medium storing computer-executable instructions that, when executed by one or more processors, cause the one or more processors to perform operations comprising: receiving an image from an image sensor associated with an autonomous vehicle; inputting at least a portion of the image into a machine learned (ML) model; determining, by the ML model, a set of outputs, the set of outputs comprising: a semantic segmentation associated with the object; depth data associated with at least the portion of the image; and an instance segmentation associated with the object; and controlling the autonomous vehicle based at least in part on at least one of the ROI, the semantic segmentation, the instance segmentation, or the depth data.

AH. The non-transitory computer-readable medium of paragraph AG, wherein determining the set of outputs comprises: determining a first set of features associated with a first resolution; determining a second set of features associated with a second resolution, the first resolution differing from the second resolution; upsampling, as an upsampled features, the second features to have a same resolution as the first resolution; and combining, as combined features, the upsampled features with the first features, wherein at least one of the semantic segmentation, depth data, or instance segmentation is based at least in part on the combined features.

AI. The non-transitory computer-readable medium of paragraph AG or AH, wherein determining the set of outputs further comprises: downsampling, as downsampled features, the combined features to reduce a number of channels associated with the combined features; convolving, as convolved features, the downsampled features two or more times according to different dilation rates; upsampling, as a feature data structure, the convolved features, and wherein at least one of the semantic segmentation, depth data, or instance segmentation is based at least in part on the feature data structure.

AJ. The non-transitory computer-readable medium of any one of paragraphs AG-AI, wherein the set of outputs further comprises a three-dimensional ROI.

AK. The non-transitory computer-readable medium of paragraph AJ, wherein: the set of outputs further comprises directional data that indicates a center of the object; and determining the three-dimensional is based at least in part on the semantic segmentation, the depth data, the directional data, and the instance segmentation.

AL. The non-transitory computer-readable medium of any one of paragraphs AG-AK, wherein determining the depth data comprises: determining, a depth bin from among a set of depth bins, the depth bin associated with a discrete portion of the environment; and determining a depth residual associated with the depth bin the depth residual indicating a deviation of a surface associated with the discrete portion from a position associated with the depth bin.

AM. The non-transitory computer-readable medium of any one of paragraphs AG-AL, wherein determining the depth bin comprises: determining a smoothed set of logits based at least in part on determining an average or probability distribution of logits of other discrete portions in a region surrounding the discrete portion; and selecting the depth bin from among the set of depth bins based at least in part on determining the depth bin is associated with a maximum smoothed logit value among the smoothed set of logits.

AN. The non-transitory computer-readable medium of any one of paragraphs AG-AM, wherein: the set of outputs further comprises directional data that indicates a center of the object; and determining the instance segmentation is based at least in part on the semantic segmentation, the depth data, and the directional data.

AO. A system comprising: one or more processors; and a memory storing processor executable instructions that, when executed by the one or more processors, cause the system to perform operations comprising any of the operations recited by any one of claims A-F or Z-AF.

AP. An autonomous vehicle comprising: one or more processors; and a memory storing processor executable instructions that, when executed by the one or more processors, cause the system to perform operations comprising any of the operations recited by any one of claims A-F or Z-AF.

AP. The autonomous vehicle of paragraph AP further comprising one or more sensors.

AQ. A non-transitory computer-readable medium storing processor executable instructions that, when executed by the one or more processors, cause the one or more processors to perform operations comprising any of the operations recited by any one of claims A-F or Z-AF.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving image data;
   inputting at least a portion of the image data into a machine-learning (ML) model;
   determining, by the ML model, a region of interest (ROI) associated with an object that appears in the image;
   determining, by the ML model and based at least in part on the ROI, additional outputs, the additional outputs comprising:
     a semantic segmentation associated with the object, the semantic indicating a classification of the object;
     directional data that indicates a center of the object;
     depth data associated with at least the portion of the image; and
     an instance segmentation associated with the object;
   determining a consistency loss based at least in part on two or more of the ROI, the semantic segmentation, the directional data, the depth data, or the instance segmentation;
   altering, as a trained ML model and based at least in part on the consistency loss, one or more parameters of the ML model; and
   transmitting the trained ML model to an autonomous vehicle.

2. The method of claim 1, wherein:
   determining the ROI is based at least in part on:
     determining a first set of features associated with a first resolution; and
     determining a second set of features associated with a second resolution,
   wherein determining the additional outputs is further based at least in part on the first set of features and the second set of features.

3. The method of claim 1, further comprising determining, by the ML model and based at least in part on two or more of the ROI, the semantic segmentation, the directional data, the depth data, or the instance segmentation, a three-dimensional ROI associated with the object.

4. The method of claim 3, wherein the determining the consistency loss comprises:
   determining, based at least in part on at least one of the semantic segmentation, depth data, instance segmentation, or the three-dimensional ROI, a two-dimensional bounding region; and
   determining a difference between the ROI and the two-dimensional bounding region.

5. The method of claim 1, wherein the depth data comprises a depth bin output indicative of a discrete depth and a depth residual indicative of an offset from the depth bin.

6. A system comprising:
one or more processors; and
a memory storing computer-executable instructions that, when executed by the one or more processors, cause the system to perform operations comprising:
receiving image data;
inputting at least a portion of the image data into a machine-learning (ML) model;
determining, by the ML model, a region of interest (ROI) associated with an object that appears in the image;
determining, by the ML model and based at least in part on the ROI, additional outputs, the additional outputs comprising:
a semantic segmentation associated with the object, the semantic indicating a classification of the object;
depth data associated with at least the portion of the image; and
an instance segmentation associated with the object;
determining a consistency loss based at least in part on two or more of the ROI, the semantic segmentation, the depth data, or the instance segmentation; and
altering, as a trained ML model and based at least in part on the consistency loss, one or more parameters of the ML model.

7. The system of claim 6, wherein:
determining the ROI is based at least in part on:
determining a first set of features associated with a first resolution; and
determining a second set of features associated with a second resolution,
wherein determining the additional outputs is further based at least in part on the first set of features and the second set of features.

8. The system of claim 6, wherein the operations further comprise determining directional data that indicates a center of the object, and wherein determining the instance segmentation is based at least in part on the semantic segmentation, the depth data, and the directional data.

9. The system of claim 6, wherein the operations further comprise:
determining directional data that indicates a center of the object; and
determining a three-dimensional ROI based at least in part on the semantic segmentation, the depth data, the directional data, and the instance segmentation.

10. The system of claim 9, wherein the determining the consistency loss comprises determining a difference between the depth data and bounds of the three-dimensional ROI.

11. The system of claim 6, wherein the determining the consistency loss comprises:
determining, based at least in part on one or more of the semantic segmentation, depth data or instance segmentation, a two-dimensional bounding region; and
determining a difference between the ROI and the two-dimensional bounding region.

12. The system of claim 6, wherein the operations further comprise determining a certainty associated with at least one of the semantic segmentation, the depth data, and the instance segmentation, and wherein the consistency loss is further based at least in part on the uncertainty.

13. A non-transitory computer-readable medium storing computer-executable instructions that, when executed by one or more processors, cause the one or more processors to perform operations comprising:
receiving image data;
inputting at least a portion of the image data into a machine-learning (ML) model;
determining, by the ML model, a region of interest (ROI) associated with an object that appears in the image;
determining, by the ML model and based at least in part on the ROI, additional outputs, the additional outputs comprising:
a semantic segmentation associated with the object, the semantic indicating a classification of the object;
depth data associated with at least the portion of the image; and
an instance segmentation associated with the object;
determining a consistency loss based at least in part on two or more of the ROI, the semantic segmentation, the depth data, or the instance segmentation; and
altering, as a trained ML model and based at least in part on the consistency loss, one or more parameters of the ML model.

14. The non-transitory computer-readable medium of claim 13, wherein:
determining the ROI is based at least in part on:
determining a first set of features associated with a first resolution; and
determining a second set of features associated with a second resolution,
wherein determining the additional outputs is further based at least in part on the first set of features and the second set of features.

15. The non-transitory computer-readable medium of claim 13, wherein the operations further comprise determining directional data that indicates a center of the object, and wherein determining the instance segmentation is based at least in part on the semantic segmentation, the depth data, and the directional data.

16. The non-transitory computer-readable medium of claim 13, wherein the operations further comprise:
determining directional data that indicates a center of the object; and
determining a three-dimensional ROI based at least in part on the semantic segmentation, the depth data, the directional data, and the instance segmentation.

17. The non-transitory computer-readable medium of claim 16, wherein the determining the consistency loss comprises determining a difference between the depth data and bounds of the three-dimensional ROI.

18. The non-transitory computer-readable medium of claim 13, wherein the determining the consistency loss comprises:
determining, based at least in part on one or more of the semantic segmentation, depth data or instance segmentation, a two-dimensional bounding region; and
determining a difference between the ROI and the two-dimensional bounding region.

19. The non-transitory computer-readable medium of claim 13, wherein the operations further comprise determining a certainty associated with at least one of the semantic segmentation, the depth data, and the instance segmentation, and wherein the consistency loss is further based at least in part on the uncertainty.

20. The non-transitory computer-readable medium of claim 13, wherein the depth data comprises a depth bin output indicative of a discrete depth and a depth residual indicative of an offset from the depth bin.

* * * * *